3,267,070
SELF-EXTINGUISHING POLYSTYRENE RESINS CONTAINING TRIBROMOALLYL ALCOHOL ESTERS
William F. Tousignant and Richard T. Dickerson, Midland, Mich., assignors to The Dow Chemical Company, Midland, Mich., a corporation of Delaware
No Drawing. Filed Feb. 4, 1963, Ser. No. 256,117
9 Claims. (Cl. 260—45.85)

This invention concerns compositions of alkenyl aromatic polymers which are self-extinguishing or flameproof. More precisely we have found that polystyrene containing a small amount of an ester of 2,3,3-tribromoallyl alcohol is a Class self-extinguishing composition, according to Underwriter's Subject No. 94 test, with no significant degradation of other physical properties.

The flammability of plastics is an important characteristic for certain uses. Building materials are sometimes not acceptable owing to a high degree of flammability; therefore standards have been established to exclude from the list of approved materials those which are considered to be hazardous. A composition is listed as Class II self-extinguishing according to the Underwriter's test when less than 25 seconds are required for the flame to extinguish when a burning specimen of the material is withdrawn from a flame.

It is common practice to reduce the flammability of thermoplastic polymers by incorporating a halogen-containing compound therein. Compounds containing bromine usually are more effective as flameproofing agents than those containing chlorine or other members of the halogen group. These agents, while imparting the necessary flameproofing properties, frequently cause other problems in the utilization of the resin. These additives are thought to provide flameproofing properties by decomposing at elevated temperatures in the flame to produce HBr, in the case of a bromine-containing additive, which extinguishes the flame. Unfortunately, many of these agents decompose and release HBr at temperatures substantially below the flame temperature of the burning resins. Many plastic articles are produced by molding or extruding the resin at an elevated temperature. The self-extinguishing agents in the resin may undergo some decomposition while the resin is at this temperature, releasing HBr which corrodes the molding and extrusion equipment. Corrosion inhibitors have been added to the resin to combat this problem; however they have not been completely effective in this regard and their presence may adversely affect other properties of the polymer. In addition to the corrosion problem the breakdown of the halogenated compound usually produces discoloration of the finished plastic which is particularly undesirable in the case of transparent plastics such as polystyrene. A further problem is that of instability to light. Self-extinguishing plastic articles which are exposed to sunlight may become discolored as a result of the photochemical effects of the actinic rays on the halogenated compounds.

It is therefore an object of our invention to produce a Class II self-extinguishing styrene polymer having high thermal stability. It is also an object to reduce the corrosivity of self-extinguishing polystyrene during molding and extrusion operations. A further object is to produce a Class II self-extinguishing composition having a high resistance to photochemical decomposition.

We have accomplished these objectives by intimately incorporating with the styrene polymer an ester of 2,3,3-tribromoallyl alcohol and an acid which may be either a saturated or unsaturated aliphatic acid, as well as an aromatic acid and may be either mono- or polycarboxylic.

The styrene polymer can be a homoploymer of a monovinyl aromatic compound such as styrene, vinyltoluene, vinylxylene, isopropylstyrene, p-tert.-butylstyrene, chlorostyrene, dischlorostyrene, or a copolymer of any two or more of such monovinyl aromatic compounds, or a copolymer of a predominant amount of one or more of such monovinyl aromatic compounds and a minor amount of another monoethylenically unsaturated organic compound copolymerizable therewith, or a high impact styrene polymer which contains about 2 to 20 percent by weight of a rubber such as polybutadiene or a butadiene-styrene copolymer and correspondingly from about 98 to 80 percent of a chemical combined monovinyl aromatic compound, e.g. styrene.

The ester can be an ester of an aliphatic or an aromatic acid containing from 1 to about 12 carbon atoms.

Among the acids which may be esterified with the 2,3,3-tribromoallyl alcohol to produce esters suitable for use as self-extinguishing agents are formic, acetic, bromoacetic, methoxyacetic, acrylic, 2,3,3-tribromoacrylic, n-valeric, methacrylic, levulinic, 11 - bromoundecanoic, cyclohexane carboxylic, fumaric, maleic, oxalic, succinic, adipic, 1,2,3,4-butane tetracarboxylic, furoic, benzoic, p-chlorobenzoic, 2,4-dichlorobenzoic, m-bromobenzoic, p-bromobenzoic, salicylic, toluic, phenylcarbonic, anisic, phenylacetic, 2,4-dichlorophenoxy acetic, and phthalic.

The amount of ester which we have found to be effective in producing the Class II resin is between about 2 and 10 percent by weight of the resin, depending in part upon which ester is used. It is desirable to use the minimum amount required for Class II properties to avoid decomposition of the ester and discoloration of the resin at elevated temperatures or by photochemical breakdown. Tribromoallyl alcohol esters of most of the above-named acids, when mixed with polystyrene at a concentration between about 3 percent and 8 percent by weight, produce a Class II resin without significant degradation of other properties.

The 2,3,3-tribromoallyl alcohol may be prepared by brominating 2,3-dibromoallyl alcohol at 60–70° C. then reacting the resulting tetrabromopropanol with an aqueous 50 weight percent NaOH solution at 30–35° C. The crude 2,3,3-tribromoallyl alcohol is separated by filtering and is purified by recrystallization from a solution of toluene and naphtha. Esters of the alcohol may be prepared by the Schotten-Baumann method of synthesis wherein the alcohol and an acid chloride are reacted at low temperature in the presence of strong caustic. An alternative method is the direct esterification using an acid catalyst and removal of the water by azeotropic distillation with toluene.

Although the ester may be added to the resin by milling or mixing at elevated temperature we prefer to mix it with the monomers at the start of the polymerization to obtain a more intimate mixture and avoid thermal decomposition. Small quantities of polystyrene containing sufficient agent to obtain 5 percent by weight of bromine in the resin were prepared to evaluate the various bromine compounds as self-extinguishing agents. These experimental compositions were produced by dissolving the bromine compounds in styrene monomer then polymerizing by suspension polymerization in the presence of 0.25 percent benzoyl peroxide as catalyst for 16 hours at 90° C., then for five hours more at 110° C. After washing and devolatilizing the polymer beads, standard test bars were made by compression molding. When suspension polymerization is not possible owing to either hydrolytic instability or insolubility of the ester in styrene, the ester may be incorporated by bulk polymerization for 18 hours at 120° C. in the presence of 0.1 percent di-tert. butyl peroxide as catalyst or by dissolving the ester and polymer in a common solvent such as methylene chloride then evaporating the solvent. The properties of these polymers containing sufficient ester to provide approximately 5 percent by weight of bromine in the composition are listed in Table I.

TABLE I

| Esters of 2,3,3-tribromo-allyl alcohol (TBA) | T.D.T., °C. | Mold Corrosion | Oven Stability | Light Stability | S.E. (Sec.) |
|---|---|---|---|---|---|
| TBA formate | 290 | A | A | C | 1,1 |
| TBA acetate | >290 | B | A | B | 1,1 |
| TBA bromoacetate | 277 | A | A | A | 0,0 |
| TBA methoxyacetate | >290 | A | A | D | 0,0 |
| TBA acrylate | >290 | B | A | B | 2,3 |
| TBA 2,3,3-tribromoacrylate | >290 | A | A | B | 1,0 |
| TBA n-valerate | 280 | C | B | D | 0,0 |
| TBA methacrylate | 273 | C | A | B | 3,1 |
| TBA levulinate | 265 | A | A | C | 1,1,2 |
| TBA 11-bromoundecanoate | >290 | A | A | C | 0,0,1 |
| TBA cyclohexane carboxylate | 255 | A | A | A | 0,0 |
| Bis(TBA) fumarate | 290 | B | B | A | 2,1 |
| Bis(TBA) maleate | >290 | A | B | A | 1,1 |
| Bis(2,3-dibromo-2-butenyl) maleate | >290 | A | A | A | 0,0 |
| Bis(TBA) oxalate | >290 | A | B | C | 2,1 |
| TBA succinate | >290 | A | B | B | 0,0 |
| TBA adipate | >290 | A | B | C | 0,1 |
| TBA 1,2,3,4-butane tetracarboxylate | >290 | A | A | A | 1,1,4 |
| TBA furoate | >290 | A | A | C | 2,0,0 |
| TBA benzoate | >290 | A | A | C | 1,0 |
| TBA chlorobenzoate | >290 | A | B | C | 1,0 |
| TBA 2,4-dichlorobenzoate | >290 | A | A | C | 2,2 |
| TBA m-bromobenzoate | >290 | A | B | A | 1,2,1 |
| TBA salicylate | >290 | B | B | D | 0,1 |
| TBA toluate | >290 | A | A | B | 2,0,1 |
| TBA phenyl carbonate | >290 | A | A | C | 8,2,1 |
| TBA anisate | >290 | A | A | B | 1,1 |
| TBA phenylacetate | >290 | A | A | B | 1,0 |
| TBA 2,4-dichlorophenoxyacetate | >290 | A | A | C | 1,0,1 |
| Bis(TBA) phthalate | >290 | B | B | A | 1,2 |

The thermal degradation temperature (T.D.T.) in Table I is the temperature at which HBr is liberated from the polymer composition and is indicative of mold corrosion and other degradation problems. This temperature is determined by placing a 2 gram sample of the polymer in a nitrogen-flushed test tube and immersing the tube in a temperature-controlled oil bath. After five minutes the tube is flushed with nitrogen for 10 seconds and the exit gas passed into a dilute solution of bromthymol blue indicator. A color change in the solution reveals that HBr has been liberated at that particular oil bath temperature.

Mold corrosion was determined by placing a polished steel chip on a quantity of the polymer and maintaining a temperature of 150° C. for 15 minutes. The chip was stored for 24 hours in a room held at 73° F. and 50 percent relative humidity, then the extent of the corrosion observed.

The oven stability was determined by placing test bars in an air oven at 150° C. for 64 hours and noting the color change at the end of that time. Light stability was determined by exposing a test bar to ultraviolet light in a Fade-Ometer at 145° F. for 50 hours.

Self-extinguishing (S.E.) properties were measured using Underwriter's Subject No. 94 test procedure. The number of seconds required for the burning polymer to extinguish after the removal of the flame was recorded. At least two tests were run for each sample. Class II self-extinguishing bars must extinguish in less than 25 seconds, however times in excess of 10 seconds frequently are not reproducible within a range of desired accuracy, therefore we prefer compositions having extinguishing times below 10 seconds.

The mold corrosion ratings were established on the basis that chips rated "A" had a bright, mirror-like finish at the end of the test. Those chips having a tarnished appearance were rated "B" while slightly pitted surfaces were rated "C." The "D" rating was assigned to those having excessive pitting and covered with brown oxide.

The oven and light stability were rated "A" when the exposed specimen was clear to slightly yellow. The "B" rating was given to those which were distinctly yellow without sufficient darkening to produce a brown tinge, whereas the "C" rating was given to those which were dark yellow with a slightly brown tinge. Those specimens which were brown to black in appearance were rated "D."

As pointed out above, the tests using the compounds in Table I were made with approximately 5 percent by weight of bromine in the polymer. Many of the compositions recorded in Table I had low self-extinguishing times so that the quantity of ester incorporated in the polymer can be reduced substantially without the time for self-extinguishment increasing to 10 seconds. Such a lowering of the bromine content will improve decomposition temperature, mold corrosion, oven and light stability. For example, bis(2,3,3-tribromoallyl)maleate provides Class II properties when the polystyrene contains only 2.9 percent by weight of bromine provided by this compound. Polystyrene containing 2.1 percent by weight of bromine provided by bis(2,3,3-tribromoallyl)succinate meets Class II requirements.

The amount of bromine-containing ester required to render polystyrene self-extinguishing within 25 seconds as required for Class II varies with the particular compound employed. However, an amount between 1 and 10 percent by weight of the aforementioned esters of 2,3,3-tribromoallyl alcohol is satisfactory or adequate. The acid which is esterified with the alcohol preferably should not contain more than about 12 carbon atoms. Higher molecular weight compounds have a tendency to plasticize the polystyrene and otherwise adversely affect its physical properties owing to the comparatively large amount of the compound which must be added to the polymer to obtain the requisite bromine concentration. Also, the solubility of the bromine compound in polystyrene may be so low that it does not produce a transparent plastic at the required concentration. On the other hand, esters of acids having only one or two carbon atoms on the molecule have sufficient volatility at temperatures in the range from 150°–250° C. that they may be lost in some processing operations.

The acid also may be halogenated in a manner which produces a more stable acid. The aromatic acids having halogens attached to the benzene ring, for example, m-bromobenzoic acid, and 2,4-dichlorobenzoic acid have sufficient halogen stability. Aliphatic acids halogenated on the terminal carbon atom as 11-bromoundecanoic and bromoacetic as well as acids having a halogenated —C=C— linkage where all of the hydrogen atoms on these carbons have been replaced as in 2,3,3-tribromoacrylic acid are stable. Also, one of the bromine atoms at the number 3 position in the allyl group may be replaced by an alkyl group as in the case of bis(2,3-dibromo-2-butenyl)maleate. The properties of a resin containing this agent are reported on Table I where it can be seen that this material is equally effective as the bis(2,3,3-tribromoallyl)maleate.

The esters of unsaturated acids such as fumaric, maleic, acrylic and methacrylic have the further advantage that the unsaturated linkage becomes locked in the polymer structure whereby the ester cannot be leached out of the polymer.

In addition to the use of these esters in transparent alkenyl aromatic polymers such as polystyrene they may also be used in high impact polystyrene which contains about 2 to 20 percent of a rubber such as polybutadiene or a butadiene-styrene copolymer, and correspondingly from 98 to 80 percent of a monovinyl aromatic compound, e.g. styrene. The concentration of ester required to produce Class II self-extinguishing polymers is typically about 10 to 25 percent greater for the high impact polymers, than that required for the transparent styrene polymer material, i.e., a bromine concentration of from about

We claim:

1. A self-extinguishing polystyrene resin composition containing from about 2 to about 12 percent by weight of an ester of 2,3,3-tribromoallyl alcohol and an organic acid, said acid having from 1 to about 12 carbon atoms in the molecule.

2. The resin composition of claim 1 wherein said organic acid is an aromatic acid selected from the group consisting of benzoic, salicyclic, toluic, anisic, phenyl carbonic, phenyl acetic and halogenated derivatives thereof wherein the halogen atoms are attached to the benzene ring.

3. The resin composition of claim 1 wherein said ester is bis(2,3,3-tribromoallyl)phthalate.

4. The resin composition of claim 1 wherein said organic acid is a saturated aliphatic monocarboxylic acid selected from the group consisting of formic, acetic, methoxyacetic, n-valeric, levulinic, undecanoic, cyclohexane carboxylic, and terminally halogenated derivatives thereof.

5. The resin composition of claim 1 wherein said organic acid is an aliphatic polycarboxylic acid selected from the group consisting of oxalic, succinic, adipic, and 1,2,3,4-butane tetracarboxylic.

6. The resin composition of claim 1 wherein said organic acid is an unsaturated aliphatic carboxylic acid selected from the group consisting of fumaric, maleic, acrylic, methacrylic and 2,3,3-tribromoacrylic.

7. A self-extinguishing polystyrene resin composition containing from about 3 percent to about 8 percent by weight of bis (2,3,3-tribromoallyl) maleate.

8. A self-extinguishing polystyrene resin composition containing from about 3 percent to about 8 percent by weight of bis(2,3-dibromo-2-butenyl)maleate.

9. A self-extinguishing high impact polystyrene resin composition containing from about 3 percent to about 12 percent by weight of an ester of 2,3,3-tribromoallyl alcohol and an organic acid, said acid having from 1 to about 12 carbon atoms in the molecule.

References Cited by the Examiner
UNITED STATES PATENTS

| | | | |
|---|---|---|---|
| 2,676,946 | 4/1954 | McCurdy et al. | 260—45.85 |
| 3,001,954 | 9/1961 | Buchholz et al. | 260—45.85 |

LEON J. BERCOVITZ, *Primary Examiner.*

DONALD E. CZAJA, *Examiner.*

G. W. RAUCHFUSS, Jr., *Assistant Examiner.*